United States Patent [19]
Zweig

[11] Patent Number: 6,138,961
[45] Date of Patent: *Oct. 31, 2000

[54] WIRE CABLE TRAY

[75] Inventor: François Zweig, Bures sur Yvette, France

[73] Assignee: Metal Deploye S.A., Montbard, France

[ * ] Notice: Under 35 U.S.C. 154(b), the term of this patent shall be extended for 467 days.

[21] Appl. No.: 08/575,477

[22] Filed: Dec. 20, 1995

[30] Foreign Application Priority Data

Dec. 22, 1994 [FR] France ................................. 94 15469

[51] Int. Cl.⁷ ........................................................ F16L 3/22
[52] U.S. Cl. .......................................... 248/68.1; 211/181
[58] Field of Search ............................. 248/68.1, 49, 302; 211/181

[56] References Cited

U.S. PATENT DOCUMENTS

| | | | |
|---|---|---|---|
| 1,580,847 | 4/1926 | Moineau | 248/302 |
| 2,261,511 | 11/1941 | Baker et al. | 248/302 |
| 2,498,446 | 2/1950 | Pawsat | 248/302 |
| 3,212,742 | 10/1965 | Pavoni | 248/302 |
| 4,143,845 | 3/1979 | Harris | 248/302 |

FOREIGN PATENT DOCUMENTS

| | | | |
|---|---|---|---|
| 553039 | 7/1993 | European Pat. Off. | 248/49 |
| 571307 | 11/1993 | European Pat. Off. | 248/49 |
| 2358863 | 11/1973 | Germany | 248/49 |

*Primary Examiner*—Anita M. King
*Assistant Examiner*—Kimberly Wood Ku
*Attorney, Agent, or Firm*—Young & Thompson

[57] ABSTRACT

A cable tray is formed by a trellis of wires including longitudinal wires and transverse wires, the combination forming a trough with a bottom and sides. At least one of the longitudinal wires other than the edge longitudinal wires of the sides has a cross-section different than that of the other wires, in practice a diameter less than that of the other wires. This reduces the weight of a wire cable tray without reducing its mechanical strength.

10 Claims, 1 Drawing Sheet

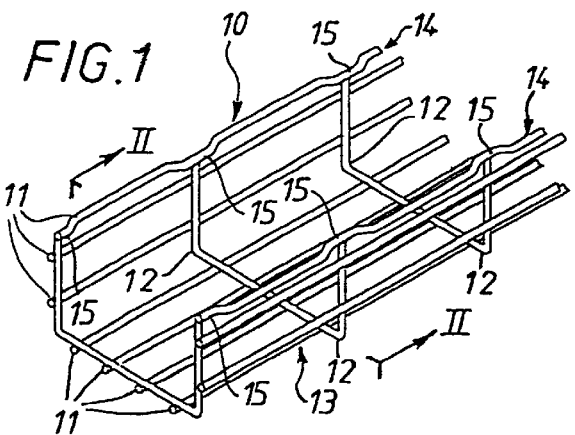
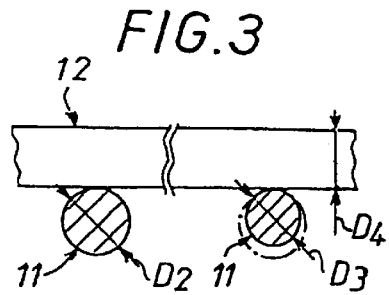
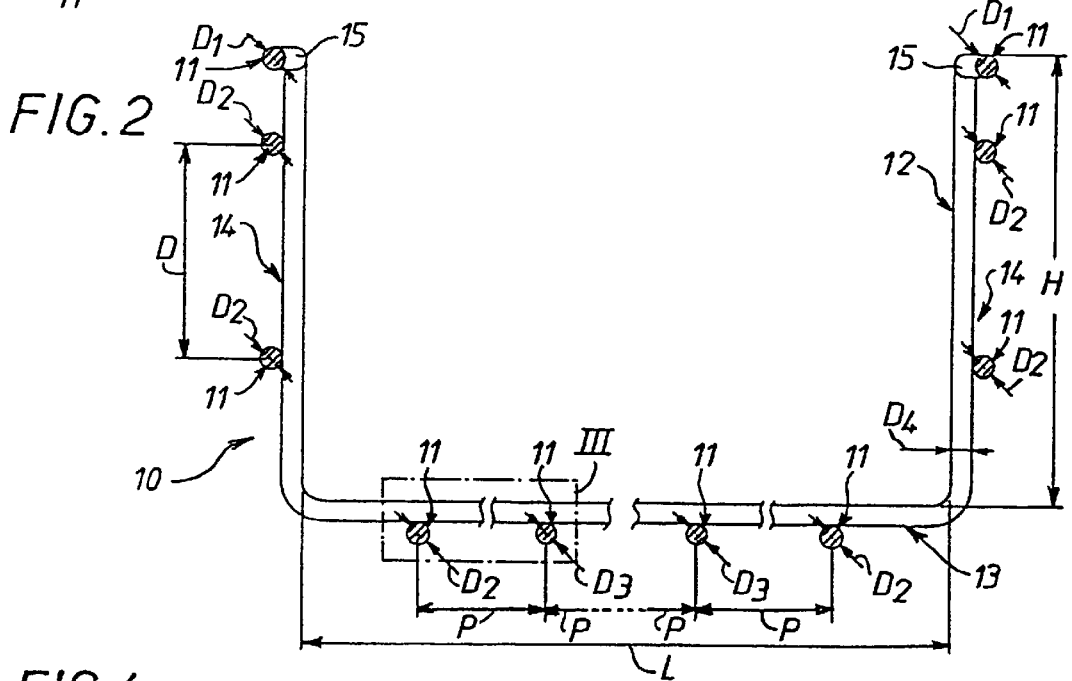
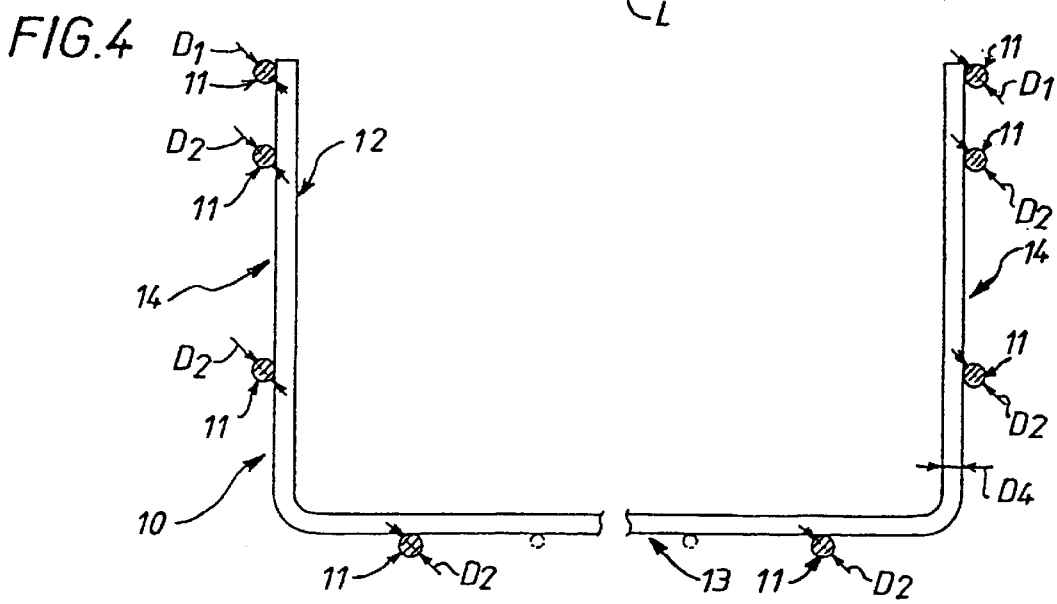

WIRE CABLE TRAY

BACKGROUND OF THE INVENTION

1. Field of the Invention

The present invention is generally concerned with cable trays, i.e. the U-section troughs used to support, contain and protect electrical cables.

2. Description of the Prior Art

The present invention is more particularly directed to cable trays which are in the form of a trellis of wires, in practise metal wires, joined together in some appropriate manner, in practise by welding, and comprising longitudinal wires usually known as warp wires that run longitudinal and in a rectilinear or quasi-rectilinear manner along all of their length and, transverse to or spaced along these longitudinal wires, U-shaped transverse wires usually called weft wires with the appropriate transverse profile, the combination forming a bottom, in practise a plane bottom, and two plane sides.

Even more particularly, the present invention is directed to cable trays of this kind in which the width measured from one side to the other is equal to at least 150 mm.

For convenience, the wires of these cable trays have until now all had the same cross-section, sometimes with the exception of the edge longitudinal wires of the sides when they are welded in a T-shape to the ends of the transverse wires.

As the wires are in practise of circular cross-section, until now they have usually all had the same diameter, sometimes with the exception of the edge longitudinal wires of the sides, as just mentioned.

The present invention is based on the observation that by varying the cross-section, and thus in practise the diameter, of the wires employed, it is advantageously possible, other things being equal, to reduce the weight of a wire cable tray, and therefore to reduce its cost, without affecting its mechanical strength.

SUMMARY OF THE INVENTION

Accordingly, the present invention consists in a cable tray formed by a trellis of wires including longitudinal wires running longitudinally along all of its length and, transverse to and spaced along said longitudinal wires, to which they are appropriately attached, U-shaped transverse wires, the combination forming a trough with a bottom and two sides, in which cable tray at least one of said longitudinal wires other than edge longitudinal wires of said sides has a cross-section different than that of the other wires.

In practise, in the case of circular cross-section round wires, in a cable tray of the invention all the longitudinal wires of the bottom except for those nearest the sides have a diameter less than that of the other longitudinal wires other than the edge longitudinal wires of the sides.

In the limiting case, in a cable tray of the invention this diameter can even be a zero diameter, the bottom then comprising only two longitudinal wires near the respective sides and the remainder, in particular the central part, having no longitudinal wires.

Calculations show, and experience confirms, that for a given mechanical strength characterized by a given sag for a given load and a given distance between supports, it is possible in accordance with the invention, other things being equal, to reduce the weight per linear meter of the cable tray, and therefore its cost, by a significant amount, possibly up to 40% in the most favorable case.

In accordance with the invention, the necessary material is disposed at the optimum point with regard to its contribution to the overall mechanical strength and it proves advantageously possible to lighten the longitudinal wires of the bottom other than those nearest the sides without significantly affecting the mechanical strength.

The features and advantages of the invention will emerge from the following description given by way of example with reference to the appended diagrammatic drawing.

BRIEF DESCRIPTION OF THE DRAWINGS

FIG. 1 is a perspective view of part of a wire cable tray in accordance with the invention.

FIG. 2 is a view in cross-section on the line II—II in FIG. 1 to a larger scale.

FIG. 3 shows to a still larger scale the detail of FIG. 2 within the box III.

FIG. 4 is a view in cross-section analogous to that of FIG. 2 of an alternative embodiment.

DETAILED DESCRIPTION OF THE PREFERRED EMBODIMENTS

As shown in the figures, the cable tray 10 in accordance with the invention is formed, in a manner that is known in itself, from a trellis of wires including longitudinal wires 11 usually called the warp wires than run longitudinally and, for example, in a rectilinear or quasi-rectilinear manner along all of its length and, transverse to and spaced along the longitudinal wires 11, to which they are appropriately attached, in practise by welding, transverse wires 12 usually called weft wires and having a U-shape configuration, the combination forming a trough with a bottom 13 which is substantially plane, as shown here, for example, and two sides 14 substantially at right angles to the bottom 13 and which can also be substantially plane, as shown here.

In practise the longitudinal wires 11 are on the outside of the transverse wires 12.

In practise, the longitudinal wires 11 and the transverse wires 12 are round metal wires with a circular cross-section.

Let L be the width of the bottom 13 and H the height of the sides 14, measured to the inside of the transverse wires 12.

As in the embodiments shown, the longitudinal wires 11 are preferably spaced along the bottom 13 with a regular pitch.

Let P be this pitch.

In practise, however, the outside or sidemost longitudinal wires 11 are at respective distances from the sides 14 that they are near.

In the embodiment shown there are four longitudinal wires 11 on the bottom 13.

This number can be greater or smaller, however, depending on the width L.

Likewise, the sides 14 may comprise, along their height H, one or more longitudinal wires 11 in addition to the edge longitudinal wire 11 at the ends of the transverse wires 12.

As previously, however, the longitudinal wire 11 of the sides 14 nearest the bottom 13 is at a distance from the latter.

In the embodiment shown there are two longitudinal wires 11 on the sides 14, in addition to the edge longitudinal wire 11.

Let D be the distance between these two longitudinal wires 11.

In practise, this distance D is substantially equal to the pitch P.

In the embodiment shown in FIGS. 1 to 3 the edge longitudinal wires 11 of the sides 14 are welded in a T-shape to the ends of the transverse wires 12.

They therefore include, in line with each of the transverse wires 12, spaced and localized flattened half-wave deformations 15 whereby they are locally abutted to the transverse wires 12 although in each of the sides 14 their main part remains in the same place as the other longitudinal wires 11 of that side.

As an alternative to this, in the embodiment shown in FIG. 4, the edge longitudinal wires 11 of the sides 14 are in contact with the sides of the transverse wires 12, like the other longitudinal wires.

The above provisions are well known in themselves and as they are not relevant in themselves to the present invention they are not described in more detail herein.

In accordance with the invention, at least one of the longitudinal wires 11 other than the edge longitudinal wires 11 of the sides 14 has a different cross-section than the other wires, meaning the longitudinal wires 11 and the transverse wires 12, and in practise this means a smaller cross-section than the latter.

To be more precise, since the wires are in practise round wires with a circular cross-section, at least one of the longitudinal wires 11 other than the edge longitudinal wires 11 of the sides 14 has a diameter different than that of the other wires, in practise a diameter less than that of the latter.

For example:

let D1 be the diameter of the edge longitudinal wires 11 of the sides 14, let D2 be the diameter of the other longitudinal wires 11 of the sides 14 and that of the longitudinal wires 11 of the bottom 13 nearest the sides 14, let D3 be the diameter of the intermediate longitudinal wires 11 of the bottom 13 other than those nearest the sides 14, and let D4 be the diameter of the transverse wires 12.

In accordance with the invention, at least one of the intermediate longitudinal wires 11 of the bottom 13 that is those other than the sidemost bottom longitudinal wires has a diameter D3 less than that D2 of the others, i.e. less than that D2 of the other longitudinal wires 11 other than the edge longitudinal wires 11 of the sides 14.

In practise, in the embodiments shown, all the intermediate longitudinal wires 11 of the bottom 13 that is those other than the ones nearest the sides 14 have a diameter D3 less than that D2 of the other longitudinal wires 11 other than the edge longitudinal wires 11 of the sides 14.

In FIG. 3, the resulting reduction in the size of one of the longitudinal wires 11 is indicated in chain-dotted line.

The ratio between the diameters D3 and D2 is between 0 and 0.9, for example, depending on the value of D2.

This implies that, at that limit, the diameter D3 of the longitudinal wires 11 of the bottom 13 other than those nearest the sides 14 can be a zero diameter, in other words, as indicated in chain-dotted line in the FIG. 4, these longitudinal wires 11 can be dispensed with.

In this case, in a cable tray in accordance with the invention, the bottom 13 includes only two longitudinal wires 11 near but spaced from the respective sides 14.

At least the longitudinal wire 11 of the sides 14 nearest the bottom 13 has a diameter D2 equal to that D2 of the longitudinal wires 11 of the bottom 13 nearest the sides 14.

In the embodiments shown this applies to all the longitudinal wires 11 of the sides 14 with the possible exception of the edge longitudinal wires 11 of the latter which, in some cases, and for convenience of manufacture, can have a smaller diameter D1.

The transverse wires 12 can have a diameter D4 different than that D2 or D3 of at least some of the longitudinal wires 11 other than the edge longitudinal wires 11 of the sides 14.

For example, this diameter D4 can be between that D2 of the longitudinal wires 11 of the bottom 13 nearest the sides 14 and that D3 of the other longitudinal wires 11 of the bottom 13.

There are given below, by way of example, for a given height H in the order of 50 mm to 100 mm, for example, and for various widths L in mm, possible values in mm for the diameters D1, D2, D3 and D4 and possible values for the number N of longitudinal wires 11 on the bottom 13 in addition to the longitudinal wires 11 nearest the sides 14, for cable trays all having the same mechanical strength, i.e. for cable trays which, for a given load, all sag by not more than 4 mm per linear meter between two supports 3 005 mm apart, the longitudinal wires 11 being assumed to be spaced apart at a pitch of 50 mm:

| L | D1 | D2 | D3 | D4 | N |
|---|----|----|----|----|---|
| 150 | 5 | 5 |   | 5 | 0 |
| 200 | 5 | 5 | 3 | 5 | 1 |
| 300 | 5 | 7 | 3 | 5 | 3 |
| 400 | 5 | 7 | 3 | 5 | 5 |
| 500 | 7 | 7 | 3 | 7 | 7 |

For the first four of these examples, the edge longitudinal wires 11 of the sides 14 are assumed to be welded in a T-shape to the ends of the transverse wires 12, as shown in FIG. 2; for the fifth example they are assumed to be welded to the sides of the transverse wires 12, as shown in FIG. 4.

Of course, the numerical values indicated in the above examples are given here merely to illustrate the invention and they must not be regarded as limiting on the invention in any way. Nor is the present invention limited to the embodiments described and shown, but encompasses any variant execution thereof.

In particular, the cross-section of the wires employed is not necessarily circular, although this is preferred.

Nor are the longitudinal wires necessarily rectilinear or quasi-rectilinear.

For example, the scope of the present invention would not be exceeded by imparting a more or less undulating shape to at least one of these longitudinal wires, in particular the wires of the sides.

Nor would the scope of the present invention be exceeded if, rather than being flat, the bottom and/or at least one of the sides were formed with at least one longitudinal rib.

In other words, the bottom and/or the sides are not necessarily flat.

There is claimed:

1. Cable tray comprising a trellis including a plurality of longitudinal wires and a plurality U-shaped transverse wires fixed to one another, the plurality of longitudinal wires running longitudinally along substantially the entire length of the tray, said plurality of transverse U-shaped wires being disposed transversely to the plurality of longitudinal wires and spaced longitudinally from one another, said trellis defining a trough having a bottom and opposed sides, said plurality of longitudinal wires including edge longitudinal wires defining free edges of the opposed sides and bottom longitudinal wires forming the bottom of the trough, said bottom longitudinal wires including sidemost bottom longitudinal wires located adjacent the respective sides of the trough and intermediate bottom longitudinal wires disposed between the sidemost bottom longitudinal wires, at least one of said intermediate bottom longitudinal wires having a cross sectional area less than that of the said sidemost bottom longitudinal wires.

2. Cable tray according to claim 1, wherein said bottom longitudinal wires are of circular cross section, said at least one intermediate bottom longitudinal wire having a diameter less than that of said sidemost bottom longitudinal wires.

3. Cable tray according to claim 2, wherein said at least one intermediate bottom longitudinal wire has a diameter less than the diameter of other intermediate bottom longitudinal wires.

4. Cable tray according to claim 1, wherein the diameter of said at least one intermediate bottom longitudinal wires is no greater than 0.9 times the diameter of said sidemost bottom longitudinal wires.

5. Cable tray according to claim 1, wherein said transverse wires have cross sectional areas greater than that of said at least one intermediate bottom longitudinal wire.

6. Cable tray according to claim 5, wherein said transverse wires have cross sectional areas less than or equal to the cross sectional areas of the sidemost bottom longitudinal wires.

7. Cable tray according to claim 1, where longitudinal wires are also provided on the sides of the trough between the edge longitudinal wires and the bottom of the trough, the cross sectional area of the side longitudinal wires being greater than the cross sectional area of said at least one intermediate bottom longitudinal wires.

8. Cable tray according to claim 7, wherein the cross sectional area of said side longitudinal wires is the same as the cross sectional area of said sidemost bottom longitudinal wires.

9. Cable tray according to claim 7, wherein there are two longitudinal wires on each of the sides of the trough.

10. Cable tray according to claim 9, wherein the spacing between the side longitudinal wires is greater than the spacing between the bottom longitudinal wires.

* * * * *